(No Model.)

J. GOWLAND.
RUNNING GEAR FOR MINING CARS.

No. 492,917. Patented Mar. 7, 1893.

Witnesses:
James F. Duhamel
Horace A. Dodge.

JOHN GOWLAND, Inventor,
by Dodge Sons,
Attys.

UNITED STATES PATENT OFFICE.

JOHN GOWLAND, OF PHILIPSBURG, PENNSYLVANIA.

RUNNING-GEAR FOR MINING-CARS.

SPECIFICATION forming part of Letters Patent No. 492,917, dated March 7, 1893.

Application filed May 17, 1892. Serial No. 433,278. (No model.)

*To all whom it may concern:*

Be it known that I, JOHN GOWLAND, a citizen of the United States, residing at Philipsburg, in the county of Centre and State of Pennsylvania, have invented certain new and useful Improvements in Running-Gear for Mining-Cars, Lumber-Trucks, and the Like, of which the following is a specification.

My invention relates to the running gear of lumber trucks, mining cars &c., and consists in a novel construction of the same as hereinafter set forth and claimed.

Figure 1:
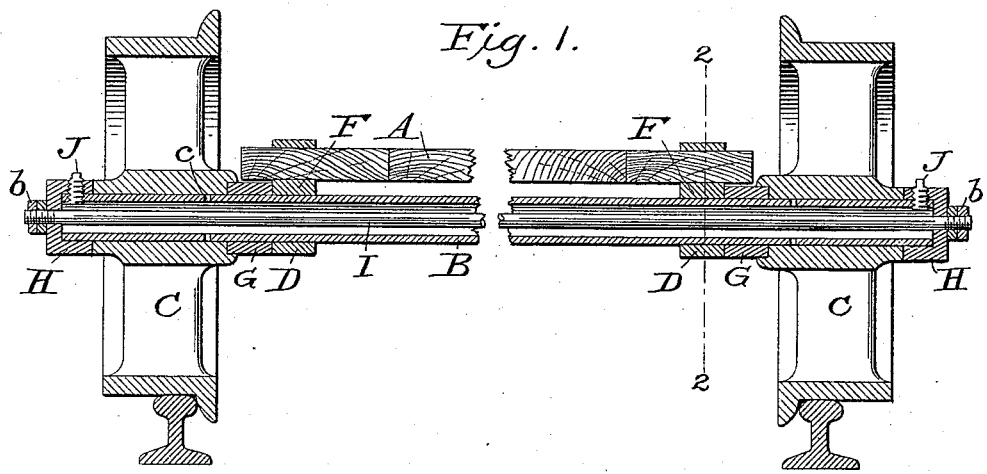
Figure 2:
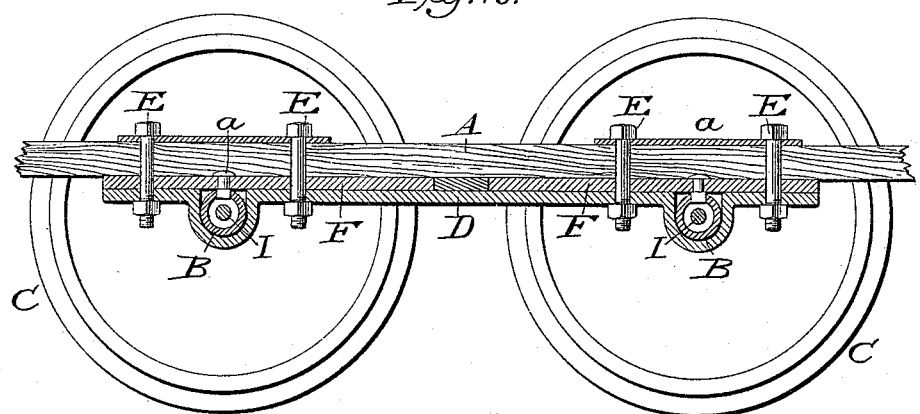

In the accompanying drawings,—Figure 1 is a transverse sectional view through the framework of one of my improved trucks or cars, showing the axle in longitudinal section; Fig. 2, a vertical longitudinal sectional view of the car on the line 2—2 of Fig. 1; and Fig. 3, a view illustrating a slight modification.

A indicates a portion of the body of a car, B the axle, and C the wheels.

To the under side of the bottom or floor of the car the axles are rigidly clamped by means of a long strap D, which is secured to the bottom of the truck by the through bolts E E, as clearly shown in Fig. 2. This strap is made long so as to embrace both axles and thereby make a stiffer and steadier truck than could be constructed if the straps were separate and independent.

Between the upper face of the axle and the bottom of the truck, I secure a plate F which, as shown in the drawings, is perforated to receive the upper end of a short bolt $a$ which projects down into the hollow axle B. The head of the bolt $a$, or that portion which is seated in the axle, is larger than the stem or shank which projects upward through the plate F, and when the end of the bolt is upset or flattened as shown in Fig. 2, the said bolt will be prevented from working out of the opening in which it is placed. This is provided for the purpose of preventing the axle from accidentally turning, should the grasp of the plate B be relaxed from any cause.

Figure 3:
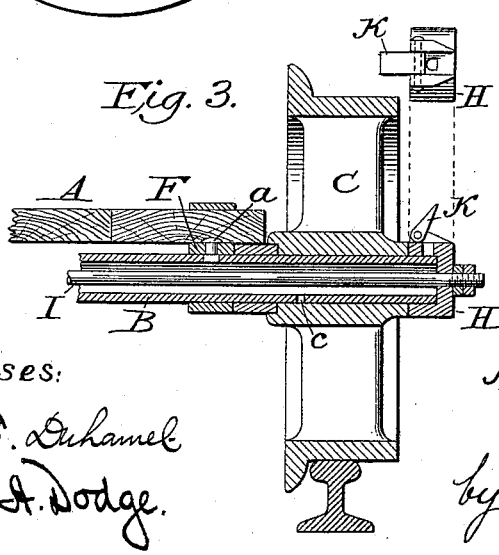

Between the inner face of each wheel and the outer face of each of the straps D, I mount upon the axle a suitable spacing collar G, as shown in Figs. 1 and 3. The outer end of the axle, which passes freely through the hub of the wheel, is provided with a cap H which closes the outer ends of the axle and thereby prevents the escape of oil therefrom. These caps are held in place upon the axle by means of a rod I passing through the axle and caps, and provided with nuts or other retaining means as shown.

In order to permit oil to be supplied to the interior of the hollow axle, I employ the removable plugs J which, as shown in Fig. 1, screw into a hole or opening extending not only through the flange of the cap H, but also through the wall of the hollow axle outside of the wheel. These plugs J serve also to assist in holding the caps upon the axle, while the caps prevent the wheel from working off the ends of the axle.

That portion of the axle within the hubs of the wheels will be provided with one or more oil holes $c$, so as to permit the lubricant to distribute itself over the bearing surfaces.

Instead of employing the removable plug J, in some cases I form the caps H each with a hinged lid or cover K, as shown in Fig. 3.

Having thus described my invention, what I claim is—

1. In a mining truck, the combination with the body or frame, of the wheels and axles, and the continuous straps D D secured to the under side of the body or frame, and each embracing two axles, substantially as shown.

2. In a mining truck, the combination with the body or frame, of the plate F applied thereto, the hollow axle, the bolt $a$ passing through the plate and into the axle, and a retaining means for the axle.

3. In a mining truck, the combination with the body or frame, of the plate F applied thereto, the hollow axle, the bolt $a$ having an enlarged head to enter a hole in the axle, and riveted or headed down at its opposite end above the plate, and a retaining means for the axle.

4. In combination with the hollow axle, collars thereon, wheels mounted upon the axle outside the collars, the caps closing the ends of the axle, the bolt passing through the axle and holding the caps in place, and an oil inlet in the caps.

5. In combination with the hollow axle, collars thereon, wheels mounted on the axle outside the collars, the caps closing the ends of the axle, the bolt passing through the axle and holding the caps in place, an oil inlet in the caps, and a screw plug for closing said inlet.

In witness whereof I hereunto set my hand in the presence of two witnesses.

JOHN GOWLAND.

Witnesses:
   F. H. SMITH,
   M. C. LAW.